United States Patent [19]
Wahl

[11] Patent Number: 5,678,466
[45] Date of Patent: Oct. 21, 1997

[54] PROCESS AND A DEVICE FOR LUBRICATING AND COOLING CUTTING EDGES AND/OR WORKPIECES IN MACHINING PROCESSES WITH CHIP REMOVAL, AND THEIR USE IN SAWING MACHINES

[76] Inventor: Wilfried Wahl, Auf dem Sand 13, D-56191 Weitersburg, Germany

[21] Appl. No.: 525,763

[22] PCT Filed: Mar. 12, 1994

[86] PCT No.: PCT/EP94/00776

§ 371 Date: Nov. 16, 1995

§ 102(e) Date: Nov. 16, 1995

[87] PCT Pub. No.: WO94/21424

PCT Pub. Date: Sep. 29, 1994

[30] Foreign Application Priority Data

Mar. 22, 1993 [DE] Germany .................. 43 09 134.2

[51] Int. Cl.$^6$ ............................................ B27B 5/29
[52] U.S. Cl. ........................ 83/168; 83/169; 83/171; 409/136; 408/61
[58] Field of Search ................. 83/168, 169, 171; 409/135, 136; 408/56, 61; 451/450, 488, 56

[56] References Cited

U.S. PATENT DOCUMENTS

| | | | |
|---|---|---|---|
| 2,722,245 | 11/1955 | Clampitt | 83/169 |
| 3,104,575 | 9/1963 | Robinson | 83/169 |
| 3,256,647 | 6/1966 | Hutton | 451/450 |
| 3,577,808 | 5/1971 | Visser et al. | 408/61 |
| 3,821,921 | 7/1974 | Rosenberg | 409/136 |
| 4,484,417 | 11/1984 | Klingerman | 451/450 |
| 4,708,539 | 11/1987 | Threadgill | 409/136 |
| 4,778,315 | 10/1988 | Duffy et al. | 409/136 |
| 4,844,047 | 7/1989 | Brehm | 125/13 |
| 4,848,200 | 7/1989 | McGehee | 83/169 |
| 5,042,618 | 8/1991 | Switalski et al. | 184/6.26 |

FOREIGN PATENT DOCUMENTS

| | | | |
|---|---|---|---|
| 0 448 944 | 10/1991 | European Pat. Off. | |
| PS 361 916 | 10/1922 | Germany | |
| PS 930 790 | 7/1955 | Germany | |
| OS 3 338 739 | 11/1984 | Germany | |
| OS 3 429 965 | 3/1985 | Germany | |
| 9116481 U | 11/1992 | Germany | |
| A 161223 | 9/1984 | Japan | 83/169 |
| 361241065 | 10/1986 | Japan | 451/488 |
| 543 344 | 12/1973 | Switzerland | |
| 1041277 | 9/1983 | U.S.S.R. | 451/450 |

OTHER PUBLICATIONS

"Dubbel", Toschenbuch für den Maschinenbau, 13th Edition, 2nd vol. (1974) pp. 675–676.

*Primary Examiner*—Maurina T. Rachuba
*Attorney, Agent, or Firm*—Wenderoth, Lind & Ponack

[57] ABSTRACT

In a process and a device as well as their use for lubricating and cooling cutting blade edges and/or workpieces in machining operations with chip removal, at least two immiscible fluids are fed to the cutting edges or workpieces. The two fluids include a first fluid for reducing friction between the cutting edge and a workpiece or chip, and a second fluid for cooling the cutting edge, workpiece, cutting edge support and, in case of need, the chips. A surprising increase of the lubricating and cooling effect can be achieved by the fact that the two fluids are stored or processed separately in separate vessels, and each fluid is conveyed from its associated container via a separate feed line to an applicator. Also, each fluid is applied from its associated applicator to the workpiece to be machined or to the cutting edge of the blade. During the relative motion of the cutting blade edge and the workpiece towards the penetration or chip removal section, the first lubricating fluid is applied first under formation of an adherent lubricant film and that then the second cooling fluid is applied on the spread lubricant film.

17 Claims, 4 Drawing Sheets

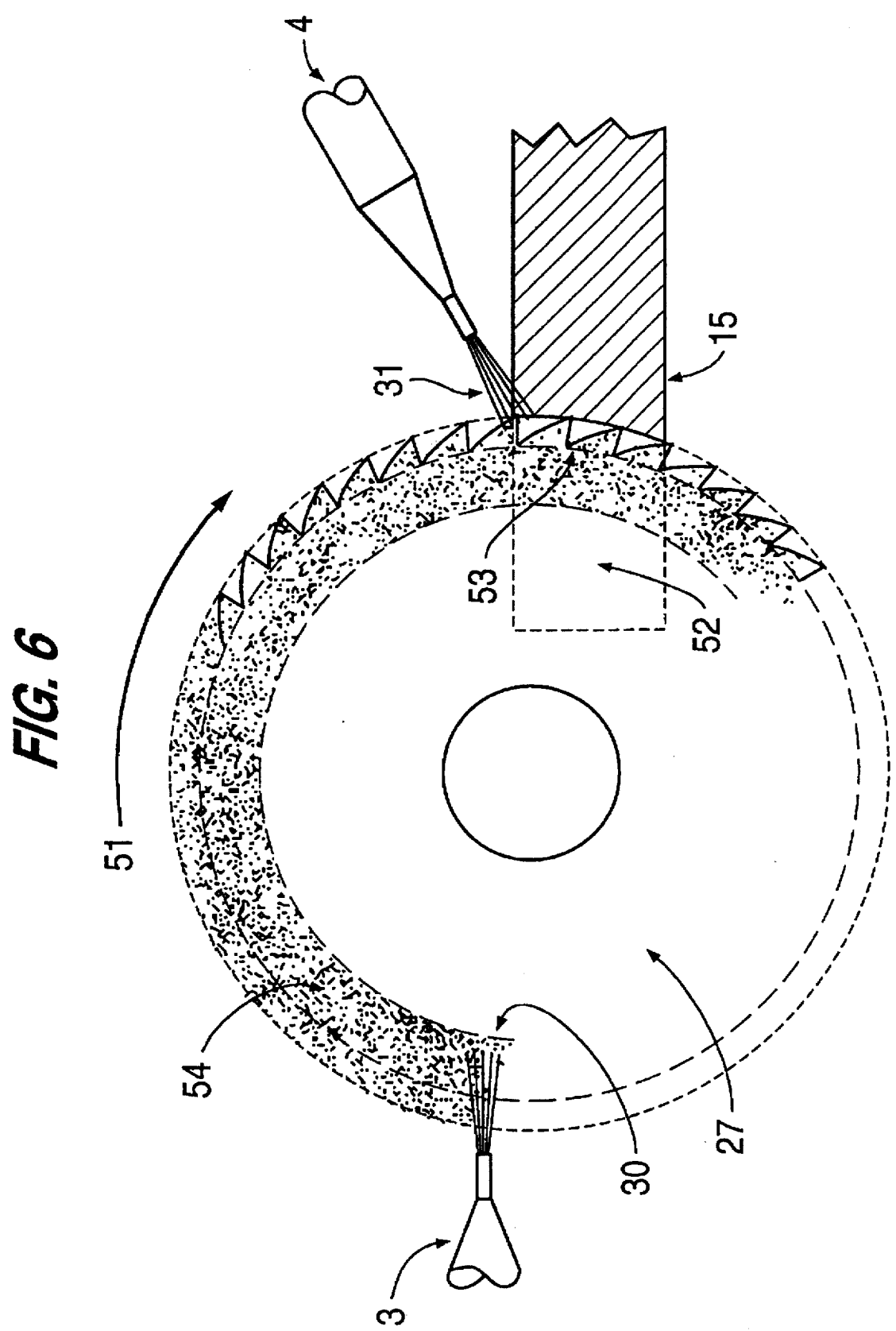

PROCESS AND A DEVICE FOR LUBRICATING AND COOLING CUTTING EDGES AND/OR WORKPIECES IN MACHINING PROCESSES WITH CHIP REMOVAL, AND THEIR USE IN SAWING MACHINES

BACKGROUND OF THE INVENTION

The present invention relates to a process and a device for lubricating and cooling cutting edges and/or workpieces in machining operations; at least two fluids, which are immiscible with each other, are fed to the cutting edges or workpieces. The fluids include a fluid substrate to reduce the friction between cutting edge and the workpiece or chips, removed therefrom and a fluid substrate to cool the cutting edge, workpiece, cutting edge support, and, if necessary, the chips removed therefrom.

In the instruction manual "DUBBEL", Taschenbuch für den Maschinenbau [pocketbook for mechanical engineering], 13th edition, 2nd volume, publisher: Springer-Verlag Berlin/Heidelberg New York, 1974, pages 675 and 676, the following can be found in chapter 4, "Cooling and lubricating":

Cutting fluids are to cool the tool cutting edge (increase in edge life and cutting speed), lubricate the machining elements (improvement of surface texturing), and wash away the removed chips. Cooling can either prolong the tool's edge life with a constant cutting speed or increase the cutting speed with constant edge life on average up to 40%. Good cutting coolants are required to have a low viscosity in addition to a high lubricating effect and cooling capacity and they must not change, resinify, thicken, or otherwise fall off in efficiency during consumption. The coolants are to protect against rust, be nonfoaming and as transparent as possible to permit observation of the cutting procedure and finally they must not have harmful effects on the human organism.

Emulsions of the type oil-in-water are often used as cutting fluids. But these neither have an optimum lubricating effect nor an optimum cooling action. Depending on the quality of the emulsion, the individual oil particles are present in the aqueous phase in the range of several micrometers, and when they impinge on a cutting edge they are not capable of forming a coherent lubricating film of high adhesiveness and shear stability. The lubricating effect is also considerably reduced by emulsifying aids, such as tylose and the like, or surfactants, soaps, etc. In addition, organic fluids having a particularly high lubricating effect are only poorly emulsifiable. For this reason oils having a comparatively low lubricating effect are mostly used for the manufacture of stable emulsions. The emulsified phase of the cutting fluid also results in an extreme reduction of the cooling effect since the oil portion, as compared to the water portion, has considerably higher evaporation temperatures and lower evaporation heat. In addition, emulsions are susceptible to spoilage bacteria and, because of the different consumption of the two water/oil-phases, change their consistency and with that their specific action during operation.

CH-PS 543 344 describes a process for cooling and lubricating tools including at least two immiscible liquids, having different lubricating and cooling properties, which are supplied to the tool. The liquids discharged by the tools and forming an unstable emulsion are collected in a common reservoir, then fed into a separating container where they are to separate from each other, and out of this container, they are re-supplied to the tools. If necessary, the different phases are separated by means of a centrifuge.

As is the case with all emulsions used as cutting coolants, the disadvantage lies in the fact that the consistency changes owing to different consumption and therefore periodic reconditioning is required. Moreover, the cooling action and in particular the lubricating effect are very limited since, on the one hand, it is not possible in a circulatory operation to achieve a really clean separation of the different phases and, on the other hand, the lubricant has an only low shear stability and adhesive capacity for reasons of emulsifiability. Also, it is not possible with an emulsion to vary the phase proportions temporarily.

DE-U-9 115 481.8 describes a cooling and lubricating device which permits feeding of very small amounts of liquid exactly to the intended metal cutting point to be cooled or lubricated. In a mixing chamber under overpressure the liquid stream is divided into smallest droplets, intimately mixed with the gas stream, and at least two bundled streams are selectively blown out of the mixing chamber to the place of metal cutting. It is also provided that the liquids, which are each particularly suitable for cooling and lubricating, can be fed into the mixing chamber or gas stream separately. It is therefore not necessary to use an emulsion that can only hardly be mixed and has the above disadvantages. On the other hand, the different fluids are jointly present in the bundled gas stream in the form of an aerosol, thus their effects are mutually impaired to a considerable extent. For this reason no coherent, adhesive, and shear-resistant lubricant film is formed at the place of metal cutting, and the cooling effect is reduced by the oil droplets carried along in the liquid stream.

DE-PS 361 916 describes a device with an electric motor driven liquid pump for machine tools. Here the inflow of coolant to the tool is controlled by the heating of the tools. The control is effected by the fact that the driving power which corresponds to the heating adjusts the speed of the pump motor, or that a valve directly controls the inflow.

DE-PS 930 790 describes a process for cooling and lubricating a cutting edge of a metal working tool. According to this invention, the coolant is sprayed in one stream into the space between the tool and the workpiece in order to reach the cutting edge. To this end, the stream is discharged from a nozzle orifice at a pressure of at least 21 bar and at a speed that is more than 40 times higher than the cutting speed, which amounts to at least 52 m/sec. The known process is particularly suitable for cooling and lubricating in turning and milling work.

DE-OS 3 338 739 A1 describes a device for feeding cutting fluids. The device supplies a pulsating high-pressure jet of cutting fluid to a drilling device or to another cutting tool and uses a reciprocating pump. The pulsation or impact frequency in the supplied cutting solution can be brought to a predetermined value, and this is done independent of the flow resistance at the outlet side. Therefore, cooling of the tool cutting edges, removal of the chips, edge life of the tool, and exactness of the worked surfaces can be kept to the desired degree even if the tool's liquid opening is of a small diameter.

EP 0 448 944 A1 describes a process and a device for the intermittent spraying of a liquid, in particular of a lubricant suspension, which is sprayed in intervals at a high frequency and a high pressure by means of a spray nozzle. The spray nozzle functions like a pressure relief valve, i.e., it automatically opens with the supply pressure of the suspension exceeding a threshold value and automatically closes when the pressure is below the threshold value. A lubricant suspension is used, in particular a high-temperature lubricant suspension mainly comprising graphite, as well as polymers and auxiliary agents, such as stabilizers suspended in water. The suspension is supplied to the spray valve under a very high pressure, for example, of 50–120 bar, in particular cases of up to 250 bar, with flow rates of 20–120 m/sec. This process requires a heavy expenditure with respect to energy facilities.

DO-OS 3 429 965 A1 describes a grinding machine, in particular a machine for grinding slideways, having a grinding spindle, at least one outlet nozzle for the cooling lubricant associated to the grinding spindle, and a cooling lubricant circulation including a cooling lubricant tank, a cooling lubricant feed line from the tank to the outlet nozzle, a cooling lubricant return line, and a pumping means for maintaining a cooling lubricant circulation. The invention includes a temperature-regulating device for adjusting the temperature of the flowing cooling lubricant to a given value and is provided in the feed line for the cooling lubricant.

SUMMARY OF THE INVENTION

Starting from this state of the art, it is the object of the present invention to provide a process, a device suitable for carrying out the process, and the use thereof. These achieve a considerable increase in the lubricating and cooling effect—as compared to the corresponding effects of known processes and devices—and the required means and expenditure with respect to material, energy, and facilities are kept within narrow economically efficient limits.

As a result of the improved lubricating and cooling effect the edge life of the tools is to be increased significantly together with an increased cutting speed, and the quality of the machined surfaces is to be optimized.

According to the present invention numerous surprising advantages result in machining operations with chip removal.

According to the present invention, a lubricating fluid and a cooling fluid are applied separately at separate points of the tool causing the formation of a lubricant film of extremely high adhesiveness and shear stability on the tool or its cutting edge. This means that less frictional heat is developed at the workpiece, tool, and chips due to a considerably improved lubricating effect resulting in reduced friction. Because of the better cooling conditions thus obtained, the quality of the machined surfaces is improved, the power consumed by the machine tool is reduced, and the edge life of the tools is significantly increased. The above are achieved at a considerably increased overall cutting speed. In this connection, the edge life and the cutting speed are often increased by a factor between 2 and 5 under comparable working and material conditions, in extreme cases up to factor 10.

According to an embodiment of the process the lubricating fluid is applied in an amount adapted to the consumption of the working process in such a manner that there is not excess lubricating fluid, and as a result recirculation or recovery of the lubricating fluid is not necessary.

This measure saves the means and energy required for recirculation, the machined products and the chips are clean and need not be subjected to an expensive aftertreatment for further processing; the lubricant consumption is minimized with optimum lubricating effect and machinery as well as the workplace and the environment remain unpolluted and do not affect health.

When sawing is carried out with a circular or band-type saw blade the cooling fluid is applied, according to another embodiment, in accordance with the required cooling of workpiece and/or saw blade in an amount adapted such that it spontaneously evaporates during the machining process; i.e., such that when the lubricating flude, which is to be applied separately, is sprayed on a point of the saw blade at a distance before the chip removing section it can be applied on a coolant-free, dry surface of the saw blade under formation of a lubricant film having good adhesion to the blade surface. This measure provides both an optimum cooling and lubricating effect, with the mutual cooperation of the different agents increasing the overall efficiency in the manner of a peak-effect.

If a tool, saw blade, or milling tool moving relative to the workpiece is concerned, another embodiment of the present invention provides that the lubricating fluid is applied at a point ahead of the chip removing section, viewed in the direction of advance or cutting motion, and that the coolant is used directly in the chip removing region, the cooling fluid being applied on the lubricant film previously formed on the tool. This essential measure of the present invention gives both agents the highest possible scope of development, both with respect to their individual and their cumulative action.

According to another embodiment of the process the lubricant fluid is applied in the form of a homogeneous aerosol in a directed spray jet under formation of an extremely thin film having high interfacial bonding and shear stability, with thicknesses ranging between 10 and 150 microns, preferably between 10 and 50 microns, and the most preferably between 5 and 20 microns. Both the extreme adhesion of the thin film to the interface of a tool and its particularly marked shear stability, which is intensified by stabilizing additives, result in a maximum lubricating power involving a significant reduction of friction or frictional heat during the work process together with an extremely minimized lubricant consumption.

According to another embodiment of the process according to the present invention the lubricating fluid is sprayed in an aerosol spray-jet by means of heated compressed air. Although in many applications the lubricant fluid is sprayed by means of air having ambient temperature, the above measure of using heated air in special applications shall also be mentioned here. This measure makes it possible that a fluid having a relatively high viscosity and particularly good stability properties can be sprayed perfectly.

According to the process of the present invention it is further preferred that a liquid which is free from mineral oil be used as the lubricating fluid. The lubricating fluid may comprise fatty acid esters and additives for the thermal and mechanical stabilization and, optionally, solids-containing additives in the form of graphite or molybdenum sulfide.

In order to reduce the surface tension the coolant fluid may most advantageously include additives in the form of surfactants, metallic soaps, polyhydric alcohols or their derivatives. This advantageously intensifies the capillary action during creeping in narrow slits at the cutting edge or between the cutting edge and the workpiece, improves the spreading coolant at the point of application, and advantageously reduces the vapor pressure.

According the another proposal of the present invention the feed rate of the one or the other, or of both active fluids may be adjusted in accordance with the power input of the machine tool during the work process. Controlling the individual fluids in this manner is uncomplicated and reliable.

Finally, the use of the process for lubricating and cooling, in particular in a work process using saw blades in a sawing machine, is advantageously provided.

BRIEF DESCRIPTION OF THE DRAWINGS

The present invention is illustrated in schematic drawings representing a preferred embodiment, the drawings showing further advantageous details of the invention:

FIG. 6 shows a side view of a circular saw blade with the fee points for the lubricant and coolant.

DETAILED DESCRIPTION OF THE INVENTION

Figure 1:
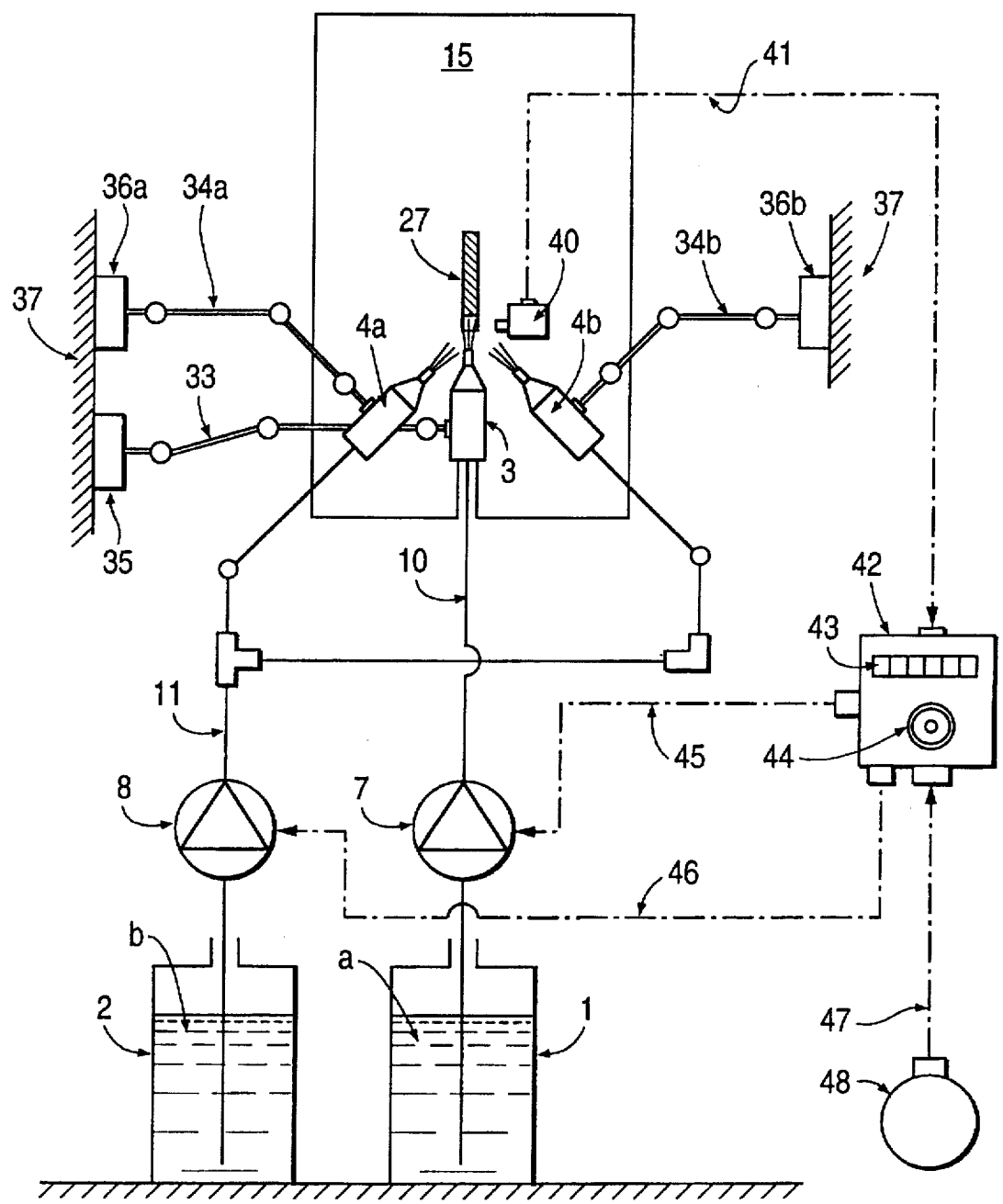
FIG. 1 shows a block diagram of a device for lubricating and cooling edges and/or workpieces with a partial top view on a table of a sawing machine.

The device shown in block diagram in FIG. 1 has a withdrawal container 2 with a fluid substrate b) for cooling and endless saw blade 27 (shown in section in the top view) and a second withdrawal container 1 with a fluid substrate a) to reduce the friction between the cutting edges of the endless saw blade 27 and the workpiece 15.

At least one separate application element 3 and 4, respectively, is connected to each of these fluids a and b. In the illustrated example only one application element 3 is assigned to fluid a, whereas two application elements 4a and 4b are provided for fluid b. However, this arrangement is not critical as one or two more applicator means may be assigned to each fluid a and b. In addition, each fluid a and b has a separate supply line 10 and 11, respectively. The supply line 10 communicates with the discharge vessel 1 for supplying fluid a to the application element 3. The supply line 11 supplies the fluid b of withdrawal container 2 to the application elements 4a and 4b. A metering pump 7 or 8 used as conveying means is located in each feed line 10 and 11, respectively.

The applicator elements 3 or 4a, 4b can be brought into position relative to the cutting edge of the endless saw blade 27 by means of adjustable hinge braces 33 or 34a, 34b, and these can be fastened to the machine frame 37 at optional points, for example, by means of magnetic shoes 35 or 36a, 36b. The position of the application elements relative to the cutting region between saw blade 27 and workpiece 15 is arranged such that the application element 3 spraying the lubricant a is located ahead of the place of metal cutting and is directed perpendicular to the saw teeth, whereas the two applicator elements 4a, 4b emit a spray of the coolant b which is directed immediately behind the leading edge of metal cut. Each of the applicator elements 4a, 4b emit the coolant spray from lateral, inclined positions against the saw tooth flanks or sides.

As is also shown in FIG. 1, the device may have a means 48 with a signal line 47 for registration of the power consumption of the machine tool during the work process. This acts upon a control unit 42 having a set-point adjustment 44 and a digital display 43. In the region of the metal cut a motion detector 40 is associated with the signal line 41. This switches the lubricating and cooling device off as soon as motion of the saw blade stops. The exemplary controlling device 40 to 48 adjusts the capacity of the metering pump in accordance with the performance of the machine tool via lines 45 and 46 in correspondence with a given reference input.

Most advantageously, the controlling unit adequately adapts the charged amount of one or both fluids a or b in response to the machine performance.

Figure 2:
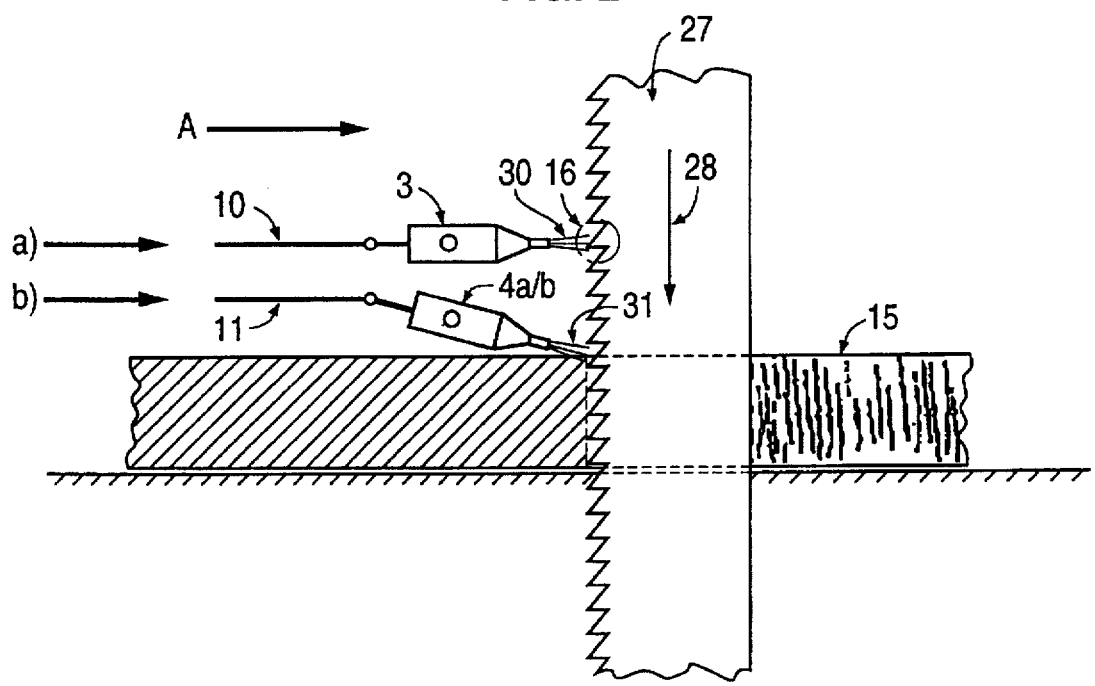
FIG. 2 shows a side view of the device illustrated in FIG. 1.
Figure 3:
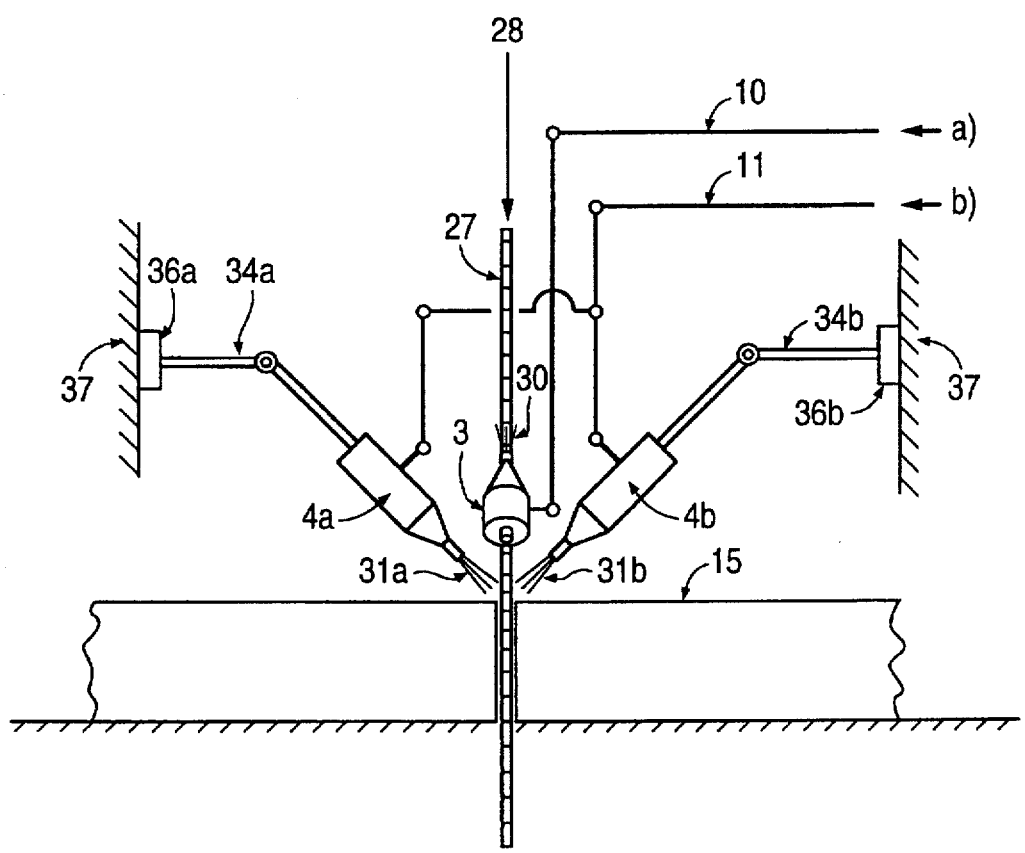
FIG. 3 shows a front elevation of the device according to FIG. 1.

FIGS. 2 and 3 show the device of FIG. 1 in a side elevation and in a projection in the direction of arrow "A" of FIG. 2. It can be seen in both views that the applicator element 3 sprays the lubricant a in an application region 16 ahead of the workpiece 15, as viewed in the direction of advance or working motion 28 of the saw blade 27. The coolant fluid b is applied on the already spread lubricant film, immediately in the engagement region of the saw blade 27 and the workpiece 15. As in FIG. 1, FIGS. 2 and 3 clearly illustrate that the different fluids a and b are each sprayed from separate withdrawal containers 1 and 2 through separate feed lines 10 and 11 by separate application elements 3 and 4.

In addition, it is seen in the illustration of FIG. 3 that the spray jet 30 of the application element 3 may be directed diagonally upward, whereas the spray jets 31a, 31b of the application elements 4a, 4b may be directed diagonally downward. In this manner, and in particular by the separate application of lubricant a) and coolant b), each of these different agents develops its optimum effect at the point where it has to perform its specific function in accordance with the cooperation between the cutting edges of a tool 27 and the workpiece 15. In any case, the lubricant is applied on the tool first and forms a lubricant film, and then the coolant is applied on the film.

Figure 5:
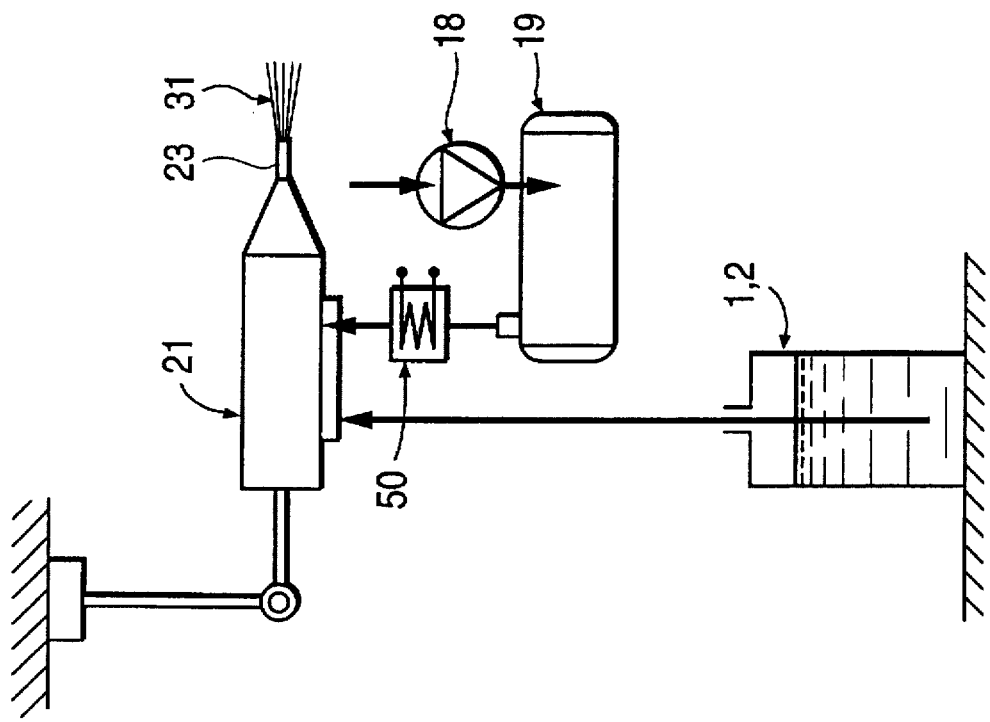
FIG. 5 shows a spray head with pressure atomizing by means of compressed air.
Figure 4:
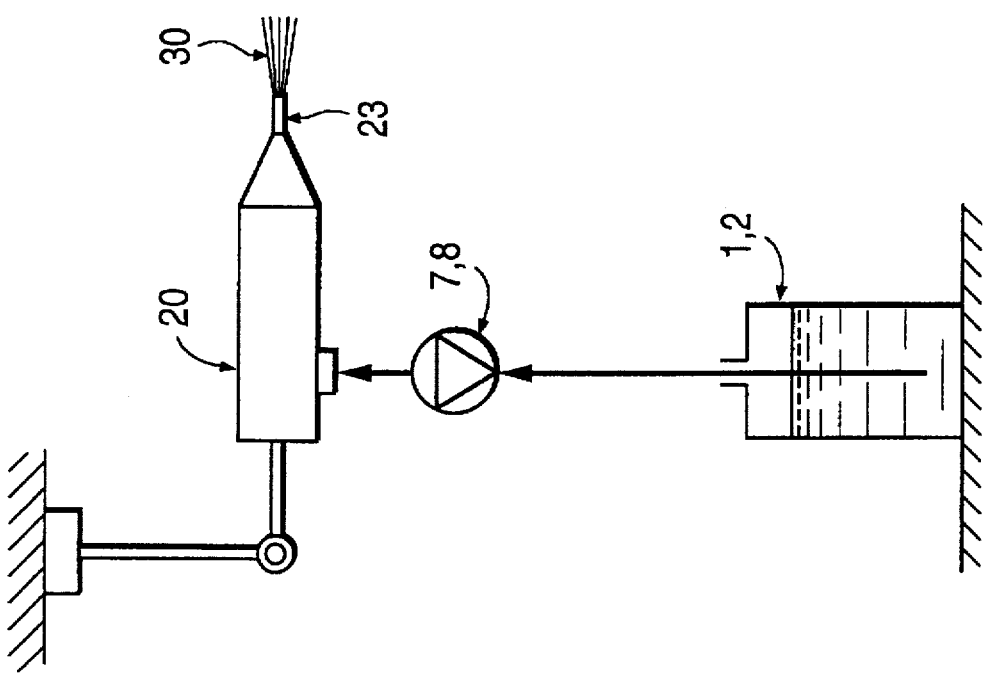
FIG. 4 shows a spray head with pressure atomizing without gas.

In can be seen in FIGS. 4 and 5 that each application element is a spray head 20 or 21 having means 23 to emit a spray jet 30 or 31 that is rich in energy and poor in mist and which may be provided with and without propellant gas. The direction of a spray jet 30 or 31 can be adjusted in a manner known per se or by known means.

Also, the spray valves can be exchanged for different application quantities or application conditions (e.g. jet pressure). FIG. 5 shows that at least one of the fluids a or b may be sprayed by means of compressed gas, compressed air, or inert gas in the form of a comparatively narrow-bundled stream 31 from an injector arrangement known per se. To this end the spraying device has a compressor 18 with a compressed-air reservoir 19. If necessary, hot air can advantageously be used in order to spray a comparatively high viscous lubricant a in a homogeneous manner. To this end, a heat exchanger 50 is arranged in the line leading to the spray head 21.

FIG. 6 shows an embodiment using the process or the device with a circular saw blade 27. It rotates in the direction of arrow 51 and forms a saw notch 52 in the workpiece 15. Lubricating application element 3 and cooling application element 4 are positioned relative to the saw blade 27. The place of metal cutting is references by numeral 53. FIG. 6 clearly illustrates that the lubricant a is applied from the application element 3 in the form of a spray jet 30 and that the spray stream 31 of the coolant is applied from the application element 4. The cutting direction 51 of the circular saw blade 27 relative to the workpiece 15 is being provided such—and this is an essential aspect of the present invention—that the lubricant spray jet 30 is applied prior to the coolant spray jet 31 so that a thin lubricant film 54 (graphically illustrated by dots) of high adhesion and shear stability forms on the surface of the saw blade 27. Only then is the coolant b applied as a spray jet on the lubricant film 54, that is to say directly in the region 53 where the metal workpiece 15 is being cut by saw blade 27.

When the chip removing saw teeth run through the cutting region 53, the coolant b, which has been applied in accordance with consumption, evaporates, and thus eliminates heat from the effective region, and cools the tool 27, workpiece 15, and the resulting chips. The passing surface of saw blade 27 remains dry and can then be coated again with a lubricant film 54 by means of the lubricant spray stream 30.

In summary, it can be said that the process according to the present invention and the corresponding device, when used in metal cutting and other machining processes with chip removal, provides the following advantages:

- optimum development of the different effects because of separate application of lubricant fluid a and coolant fluid b
- by eliminating a mixing phase of each fluid a or b—as to its active substance composition, consistency, viscosity, quantity, temperature—can be used unaffected by the other fluid;
- by maximum utilization of the available machine performance results in increased productivity with a consideration reduction of manufacturing costs;
- less tool wear or regrinding results in a considerably prolonged edge life;
- superior quality of the machined surfaces at the workpiece; also, as a result, the tolerances can be maintained with closer limits;
- no costs for aftertreatment because of clean chips, no problems with respect to waste disposal of exhausted emulsions, workplace and environment remain clean, inhaled air does not contain harmful, oil-containing aerosols because of "dry cut";
- considerably reduced consumption of fluid agents a and b.

Therefore the present invention fulfills the above mentioned objectives in an optimum manner.

I claim:

1. A lubricating and cooling process in a metal cutting operation, said process comprising:
   feeding a first fluid from a first storage container to a first spraying device, said first fluid being a liquid lubricant for reducing friction between a cutting blade edge and a workpiece;
   feeding a second fluid from a second storage container to a second spraying device, said second fluid being a liquid coolant for cooling said cutting blade edge, said workpiece and a cutting edge support, wherein said first fluid and said second fluid are immiscible liquids;
   spraying said first fluid from said first spraying device on said cutting blade during relative movement of said cutting blade toward said workpiece so as to form an adherent lubricant film on said cutting blade, wherein said lubricant film is applied on said cutting blade at a distance from a point of engagement of said cutting blade with said workpiece; and
   spraying said second fluid on said lubricating film in a set amount.

2. The lubricating and cooling process as claimed in claim 1, wherein said first fluid is applied in an amount which will be consumed during a cutting operation.

3. The lubricating and cooling process as claimed in claim 2, wherein said second fluid is applied at said point of engagement of said cutting blade with said workpiece so that said second fluid is applied on said previously applied lubricant film and on said workpiece.

4. The lubricating and cooling process as claimed in claim 2, wherein said first fluid is applied in the form of a homogeneous aerosol and forms a thin lubricating film having high interfacial bonding and shear stability at thicknesses ranging between 10 and 150 microns.

5. The lubricating and cooling process as claimed in claim 4, wherein said first fluid is sprayed by use of heated compressed air.

6. The lubricating and cooling process as claimed in claim 1, wherein said second fluid is applied at said point of engagement of said cutting blade with said workpiece so that said second fluid is applied on said previously applied lubricant film and on said workpiece.

7. The lubricating and cooling process as claimed in claim 6, wherein said first fluid is applied in the form of a homogeneous aerosol and forms a thin lubricating film having high interfacial bonding and shear stability at thicknesses ranging between 10 and 150 microns.

8. The lubricating and cooling process as claimed in claim 7, wherein said first fluid is sprayed by use of heated compressed air.

9. The lubricating and cooling process as claimed in claim 1, wherein said first fluid is applied in the form of a homogeneous aerosol and forms a thin lubricating film having high interfacial bonding and shear stability at thicknesses ranging between 10 and 150 microns.

10. The lubricating and cooling process as claimed in claim 9, wherein said first fluid is sprayed by use of heated compressed air.

11. The lubricating and cooling process as claimed in claim 1, wherein said second fluid includes at least one agent for reducing surface tension, said agent being selected from the group including surfactants, metallic soaps, polyhydric alcohols, and derivatives thereof.

12. The lubricating and cooling process as claimed in claim 1, further comprising:
    measuring power required during a cutting operation;
    comparing said measured power to a preset value; and
    adjusting a feed amount of said first fluid and a feed amount of said second fluid in response to said measured power.

13. The lubricating and cooling process as claimed in claim 1, wherein said amount of said second fluid is set such that said second fluid will evaporate so that said first fluid is applied on a dry cutting blade surface of an endless blade and said cutting blade surface will be free of said second fluid.

14. An apparatus for lubricating and cooling a cutting blade and a workpiece in a metal cutting operation, said apparatus comprising:
    a liquid lubricant storage vessel;
    at least one first liquid delivery device in fluid communication with said liquid lubricant storage vessel;
    a first metering pump for pumping liquid lubricant from said liquid lubricant storage vessel to said at least one first liquid delivery device;
    a liquid coolant storage vessel;
    at least one second liquid delivery device in fluid communication with said liquid coolant storage vessel; and
    a second metering pump for pumping liquid from said liquid coolant storage vessel to said at least one second delivery vessel,
    wherein said at least one first liquid delivery device and said at least one second liquid delivery device are positioned relative to a cutting blade such that liquid lubricant is applied on the cutting blade prior to a point of engagement between the cutting blade and the workpiece and prior to application of liquid coolant on the cutting blade so that liquid coolant is applied on the liquid lubricant.

15. The apparatus as claimed in claim 14, wherein said at least one first liquid delivery device is positioned relative to said cutting blade such that said lubricant is applied to a leading edge of the cutting blade.

16. The apparatus as claimed in claim 14, wherein said at least one second liquid delivery device comprises two liquid delivery devices positioned so as to spray liquid coolant on opposite sides of the cutting blade and on the workpiece.

17. The apparatus as claimed in claim 14, further comprising:

a control unit for controlling the amount of liquid pumped by said first and second metering pumps;

a power measuring unit for measuring power input during a metal cutting operation; and a signal line connecting said power measuring unit and said control unit, wherein the amount of fluid pumped by said first and second delivery pumps is adjusted in response a signal from said power measuring unit.

* * * * *